US011308450B2

(12) United States Patent
Zhao et al.

(10) Patent No.: US 11,308,450 B2
(45) Date of Patent: Apr. 19, 2022

(54) GENERATING PERSONALIZED SMART RESPONSES

(71) Applicant: Microsoft Technology Licensing, LLC, Redmond, WA (US)

(72) Inventors: Bing Zhao, Sunnyvale, CA (US); Bo Long, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 785 days.

(21) Appl. No.: 15/964,585

(22) Filed: Apr. 27, 2018

(65) Prior Publication Data

US 2019/0333020 A1    Oct. 31, 2019

(51) Int. Cl.
| | |
|---|---|
| *G06Q 10/10* | (2012.01) |
| *H04L 51/56* | (2022.01) |
| *G06F 16/335* | (2019.01) |
| *G06F 16/435* | (2019.01) |
| *H04L 51/52* | (2022.01) |

(52) U.S. Cl.
CPC ......... *G06Q 10/107* (2013.01); *G06F 16/335* (2019.01); *G06F 16/435* (2019.01); *H04L 51/36* (2013.01); *H04L 51/32* (2013.01)

(58) Field of Classification Search
CPC ... G06Q 10/107; G06F 16/335; G06F 16/435; H04L 51/32; H04L 51/36
See application file for complete search history.

(56) References Cited

U.S. PATENT DOCUMENTS

| | | | | |
|---|---|---|---|---|
| 9,860,200 | B1* | 1/2018 | Braun | H04L 51/02 |
| 2011/0202836 | A1* | 8/2011 | Badger | G06N 20/00 |
| | | | | 715/702 |
| 2012/0206367 | A1* | 8/2012 | Griffin | G06F 3/0236 |
| | | | | 345/169 |
| 2013/0211825 | A1* | 8/2013 | Tseng | G06F 40/40 |
| | | | | 704/10 |
| 2014/0379813 | A1* | 12/2014 | Charania | H04L 51/24 |
| | | | | 709/206 |
| 2016/0224524 | A1* | 8/2016 | Kay | G06F 3/0236 |
| 2016/0330597 | A1* | 11/2016 | Kalkounis | G06F 40/56 |
| 2017/0180276 | A1* | 6/2017 | Gershony | H04L 51/02 |
| 2017/0222961 | A1* | 8/2017 | Beach | H04L 51/02 |
| 2017/0277667 | A1* | 9/2017 | Weston | G06F 3/0484 |

(Continued)

*Primary Examiner* — Kavita Stanley
*Assistant Examiner* — William Wong
(74) *Attorney, Agent, or Firm* — Schwegman Lundberg & Woessner, P.A.

(57) ABSTRACT

Disclosed are systems, methods, and non-transitory computer-readable media for generating personalized smart responses. A messaging system receives a message transmitted as part of a communication session between a first user and a second user and determines a set of candidate responses for replying to the message. The messaging system filters the set of candidate responses based on a personalized vocabulary for the first user, yielding a set of personalized candidate responses. The personalized vocabulary for the first user is determined based on member profile data associated with the first user. The messaging system determines, based on a set of personalized candidate selection rules, a subset of the candidate responses, yielding a set of recommended responses to the message, and causes the set of recommended responses to be presented on the second client device.

18 Claims, 10 Drawing Sheets

(56) References Cited

U.S. PATENT DOCUMENTS

2018/0063044 A1* 3/2018 Mikhailov ............ H04L 67/306
2018/0189628 A1* 7/2018 Kaufmann .............. G06F 40/56
2018/0239770 A1* 8/2018 Ghotbi ................... G06F 9/453
2018/0329982 A1* 11/2018 Patel ................... G06F 16/3322

* cited by examiner

GENERATING PERSONALIZED SMART RESPONSES

TECHNICAL FIELD

An embodiment of the present subject matter relates generally to message generation and, more specifically, to generating personalized smart responses.

BACKGROUND

Digital messaging is quickly becoming the most common way to quickly communicate with friends and colleagues. For example, messaging applications are commonly used to send and receive messages between individual users and groups of users. While these messaging applications are useful, they still require users to take the time to type responses. Professionals are busy people and do not always have time to craft these responses. There are current systems that provide users with suggested responses; however, these systems have limitations and do not provide personalized messages. Accordingly, improvements are needed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
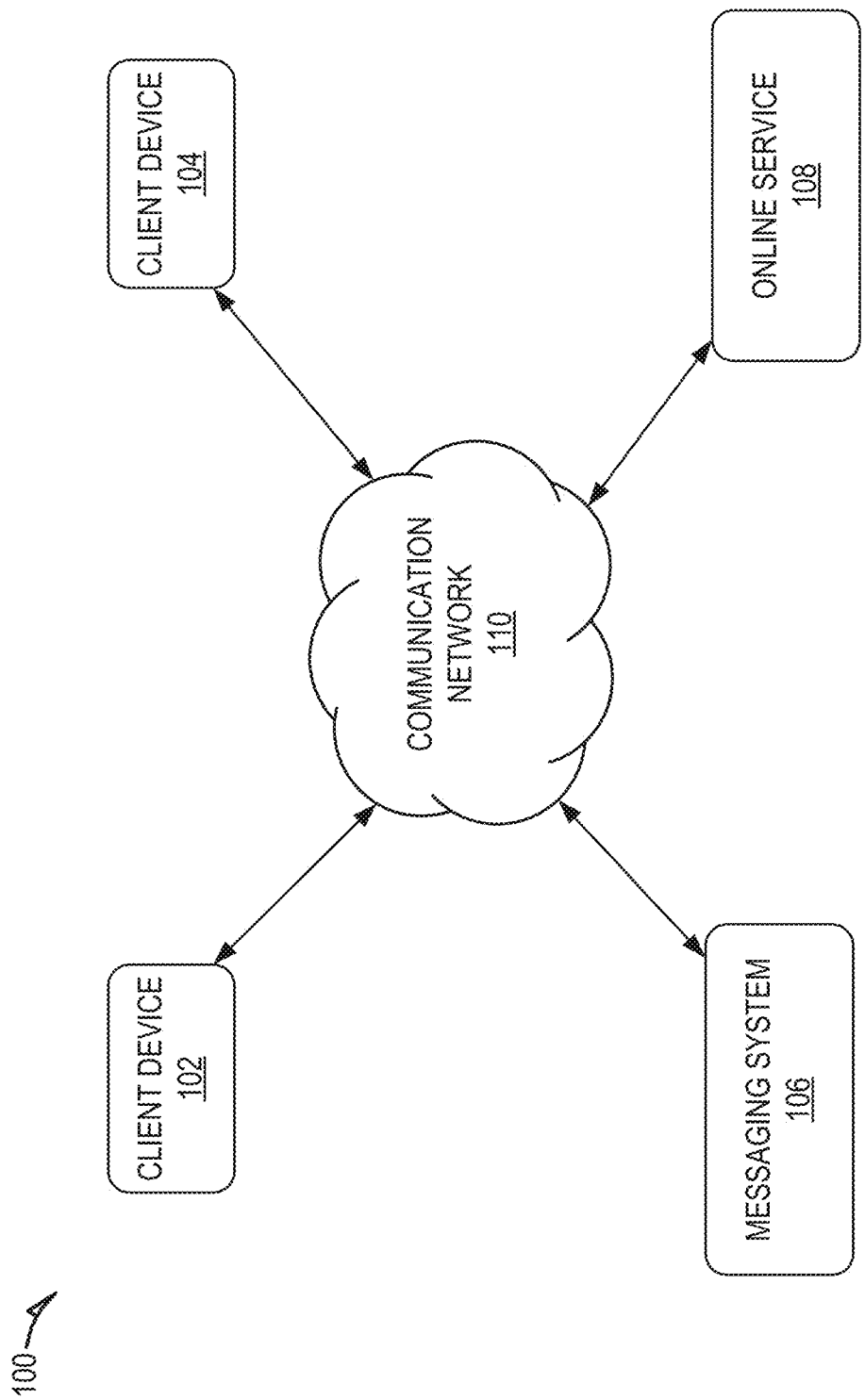
FIG. 1 shows an example system configuration, wherein electronic devices communicate via a network for purposes of exchanging content and other data.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for generating personalized smart responses. A messaging system provides a messaging platform that allows users to initiate communication sessions with one or more other users. The messaging platform provides users with a messaging interface enabling a user to select other users with whom to initiate a communication session, enter messages to be transmitted to the other users in the communication session, and read messages received from the other users in the communication session. The messaging system acts as an intermediary between the users' client devices by, for example, receiving a message that has been sent as part of a communication session from an originating client device, and then transmitting the message to appropriate destination client devices. Hence, users use their client devices to communicate with the messaging system to initiate and/or participate in communication sessions with other users.

To increase the speed at which users generate and transmit responses in a communication session, the messaging system generates recommended responses, which the user can quickly select to respond to the other users of the communication session. In this way, the user can provide a single input (e.g., tapping a recommended response) to provide a response to the other participants of the communication session, rather than typing out a reply message letter by letter and then selecting to send the message. Upon receiving a user selection of one of the recommended responses, the messaging system transmits the recommended response to the other participants of the communication session.

The messaging system generates the recommended response based on historical message data transmitted as part of previous communication sessions and user profile data associated with the participants of the communication session. The historical message data includes messages that were transmitted between client devices as part of previous communication sessions, as well as an order in which the messages were sent. The messaging system uses the historical message data to generate a statistical model, such as a shallow embedding model, which is used to determine recommended responses based on a received message. For example, upon receiving a message as part of a communication session, the messaging system uses the received message as input in the statistical model, which results in a set of candidate responses to the message. The messaging system then selects a set of recommended responses from the set of candidate responses and provides the set of recommended responses along with the received message to their intended recipient user. The user can then use the provided recommended responses to quickly and easily provide a response to the received message.

The set of candidate responses is generated from historical message data gathered from a large pool of users, meaning that the candidate responses include responses that the recipient user may not commonly use in conversation. Further, the set of candidate responses may be rather large, and thus selecting recommended responses from the set of candidate responses may be resource intensive and cause undesired latency. To alleviate these issues, the messaging system filters the set of candidate responses based on a personalized vocabulary determined for the recipient user. That is, the set of candidate responses is filtered to remove candidate responses that the recipient is not likely to use in conversation. This reduces the size of the set of candidate responses and provides a much higher quality set of candidate responses that include responses that the recipient is likely to use in conversation.

The messaging system generates the personalized vocabulary for a user based on user profile data for the user. The messaging system may be incorporated into an online service, such as a social networking service, news service, etc., to which the user has created a user profile. The user profile maintains data describing the user, such as the user's gender, occupation, address, employer, etc. Additionally, the user's profile may maintain an activity log of the user's actions, including a log of text (e.g., articles, messages, comments, etc.) that the user has either authored or read, as well as a log of the recipients of any messages. The messaging system analyzes the text to identify words that are commonly used. For example, the messaging system counts the number of occurrences of uniquely used words to identify the words that are most commonly used. The messaging system uses these commonly used words to generate the personalized vocabulary for the user. For example, the words that occurred a high number or times are determined to be words that the user would commonly use in conversation.

The messaging system uses these commonly used words to filter the set of candidate responses. For example, the messaging system removes candidate responses that include words that did not occur a threshold number of times, percentage of times, etc., in the analyzed text. As another example, the messaging system selects the candidate responses that include words that occurred at least a threshold number of times, percentage of times, etc., in the analyzed text. Filtering the candidate responses based on words that the user commonly uses and/or does not use results in a smaller resulting data set that is much higher quality. That is, the remaining candidate responses are responses that the user is likely to use in response to a received message.

The messaging system may also filter the set of candidate responses based on other contextual factors. For example, a user may use a different vocabulary based on the person they are speaking to (e.g., spouse vs. boss), the communication channel they are using (e.g., email vs. text), the gender of the person they are speaking to, the age of the person they are speaking to, the relationship between the users (e.g., client or boss), etc. Accordingly, the messaging system gathers contextual data and filters the set of candidate responses based on words that were commonly used under similar circumstances. For example, the messaging system gathers user profile data for the participants of the communication session and filters the set of candidate responses based on contextual factors determined from the user profile data. The resulting filtered set of candidate response includes responses that the user would commonly user under similar circumstances.

FIG. 1 shows an example system 100, wherein electronic devices communicate via a network for purposes of exchanging content and other data. As shown, multiple devices (i.e., client device 102, client device 104, messaging system 106, and online service 108) are connected to a communication network 110 and configured to communicate with each other through use of the communication network 110. The communication network 110 is any type of network, including a local area network (LAN), such as an intranet, a wide area network (WAN), such as the internet, or any combination thereof. Further, the communication network 110 may be a public network, a private network, or a combination thereof. The communication network 110 is implemented using any number of communications links associated with one or more service providers, including one or more wired communication links, one or more wireless communication links, or any combination thereof. Additionally, the communication network 110 is configured to support the transmission of data formatted using any number of protocols.

Multiple computing devices can be connected to the communication network 110. A computing device is any type of general computing device capable of network communication with other computing devices. For example, a computing device can be a personal computing device such as a desktop or workstation, a business server, or a portable computing device, such as a laptop, smart phone, or a tablet personal computer (PC). A computing device can include some or all of the features, components, and peripherals of the machine 1000 shown in FIG. 10.

To facilitate communication with other computing devices, a computing device includes a communication interface configured to receive a communication, such as a request, data, etc., from another computing device in network communication with the computing device and pass the communication along to an appropriate module running on the computing device. The communication interface also sends a communication to another computing device in network communication with the computing device.

In the system 100, users interact with the messaging system 106 to establish and participate in communication sessions with other users. For example, users use the client devices 102 and 104 that are connected to the communication network 110 by direct and/or indirect communication to communicate with and utilize the functionality of the messaging system 106. Although the shown system 100 includes only two client devices 102, 104, this is only for ease of explanation and is not meant to be limiting. One skilled in the art would appreciate that the system 100 can include any number of client devices 102, 104. Further, the messaging system 106 may concurrently accept connections from and interact with any number of client devices 102, 104. The messaging system 106 supports connections from a variety of different types of client devices 102, 104, such as desktop computers; mobile computers; mobile communications devices, e.g., mobile phones, smart phones, tablets; smart televisions; set-top boxes; and/or any other network enabled computing devices. Hence, the client devices 102 and 104 may be of varying type, capabilities, operating systems, etc.

A user interacts with the messaging system 106 via a client-side application installed on the client devices 102 and 104. In some embodiments, the client-side application includes a messaging system specific component. For example, the component may be a stand-alone application, one or more application plug-ins, and/or a browser extension. However, the users may also interact with the messaging system 106 via a third-party application, such as a web browser, that resides on the client devices 102 and 104 and is configured to communicate with the messaging system 106. In either case, the client-side application presents a user interface (UI) for the user to interact with the messaging system 106. For example, the user interacts with the messaging system 106 via a client-side application integrated with the file system or via a webpage displayed using a web browser application.

The messaging system 106 is one or more computing devices configured to facilitate and manage communication sessions between various client devices 102, 104. The messaging system 106 can be a standalone system or integrated into other systems or services, such as being integrated into an online service 108, such as a social networking service, new service, etc. In either case, the messaging system 106 facilitates a communication session between client devices 102 and 104, where a user participant using one client device 102 can send and receive messages with a user participant using the other client device 104.

The messaging system 106 enables a user to initiate a communication session by providing a messaging interface where the user can select other users to include in the communication session, draft messages to be transmitted to the selected other users as part of a communication session, and read messages received from the other users as part of the communication sessions. Messages transmitted by a user's client device 102 as part of a communication session are received by the messaging system 106, which forwards the message to the recipient user's client device 104. The messaging system 106 can also store the received messages along with metadata describing the messages, such as the time the messages were sent, the originating user of the message, the recipient of the message, etc.

In addition to facilitating communication sessions, the messaging system 106 also generates and provides users with recommended responses based on historical message data and user profile data. The historical message data includes messages that were transmitted between client devices 102, 104 as part of previous communication sessions, as well as an order in which the messages were sent. The messaging system 106 uses the historical message data to generate a statistical model, such as a shallow embedding model, which is used to determine recommended responses based on a received message. For example, upon receiving a message from client device 102 that is intended for client device 104 as part of a communication session, the messaging system 106 uses the received message as input in the statistical model, which results in a set of candidate responses to the message. The messaging system 106 then selects a set of recommended responses from the set of candidate responses and transmits the set of recommended responses along with the received message to client device 104 as part of the communication session. The user of client device 104 can then use the provided recommended responses to quickly and easily provide a response to the received message. For example, the user of client device 104 can provide a single input (e.g., tapping one of the recommended responses) to provide a response to the user of client device 102, rather than typing out a reply message letter by letter and then selecting to send the message. Upon receiving a user selection of one of the recommended responses from client device 104, the messaging system 106 transmits the recommended response to client device 102 as part of the communication session. Additionally, the messaging system 106 may generate and provide client device 102 with a set of recommended responses.

The set of candidate responses is generated from historical message data gathered from messages transmitted between a large pool of users, meaning that the candidate responses include responses that the recipient user may not commonly use in conversation. Further, the set of candidate responses may be rather large, and thus selecting recommended responses from the set of candidate responses may be resource intensive and cause undesired latency. To alleviate these issues, the messaging system 106 filters the set of candidate responses based on a personalized vocabulary determined for the recipient user. That is, the set of candidate response is filtered to remove candidate responses that the recipient is not likely to use in conversation. This reduces the size of the set of candidate responses and provides a much higher quality set of candidate responses that include responses that the recipient is likely to use in conversation.

The messaging system 106 generates the personalized vocabulary for a user based on user profile data for the user. As explained earlier, the functionality of the messaging system 106 may be incorporated into an online service 108. The online service 108 may be any type of online service that allows a user to create a user account, share content with other users, and view content shared by other users. For example, the online service 108 may be a social networking service, in which users created a user profile to connect with other users, share content, view posted content, message other users, etc.

The online service 108 maintains user profiles for users of the online service 108. Each user profile maintains data describing a corresponding user of the online service 108. For example, the user profile maintains data such as the user's gender, occupation, address, employer, etc. Additionally, a user's profile may maintain an activity log of the user's actions, including a log of text (e.g., articles, messages, comments, content, etc.) that the user has either authored or read through use of the online service 108. The user profile may also maintain a log of the recipient of any messages authored by the user associated with the user profile.

The messaging system 106 communicates with the online service 108 to access a user's profile and gather data that the messaging system 106 uses to generate the personalized vocabulary for the user. For example, the messaging system 106 text authored by and/or read by the user to identify words that are commonly used in the text. The messaging system 106 counts the number of occurrences of uniquely used words to identify the words that are most commonly used in the text. The messaging system 106 uses these commonly used words to generate the personalized vocabulary for the user. For example, the messaging system 106 determines set of words that occurred a high number of times, which are assumed to be words that the user would commonly use in conversation.

The messaging system 106 uses these commonly used words to filter the set of candidate responses. For example, the messaging system 106 removes candidate responses that include words that did not occur a threshold number of times, percentage of times, etc., in the analyzed text. As another example, the messaging system 106 selects the candidate responses that include words that occurred at least a threshold number of time, percentage of times, etc., in the analyzed text. Filtering the candidate responses based on words that the user commonly uses and/or does not use results in a smaller resulting data set that is much higher quality. That is, the remaining candidate responses are responses that the user is likely to use in response to a received message.

The messaging system 106 may also filter the set of candidate responses based on other contextual factors. For example, a user may use a different vocabulary based on the person they are speaking to (e.g., spouse vs. boss), the communication channel they are using (e.g., email vs. text), the gender of the person they are speaking to, the age of the person they are speaking to, the relationship between the users (e.g., client or boss), etc. Accordingly, the messaging system 106 gathers contextual data and filters the set of candidate responses based on words that were commonly used under similar circumstances. For example, the messaging system 106 gathers user profile data for the participants of the communication session from the online service 108 and filters the set of candidate responses based on contextual factors determined from the user profile data. The resulting filtered set of candidate response includes responses that the user would commonly user under similar circumstances.

Although the messaging system 106 and the online service 108 are shown as separate entities, this is just for ease of explanation. The messaging system 106 may be incorporated as part of the online service 108. For example, the messaging system 106 may be a direct messaging function offered by a social networking service, such as FACEBOOK™, LINKEDIN™, TWITTER™, etc.

Figure 2:
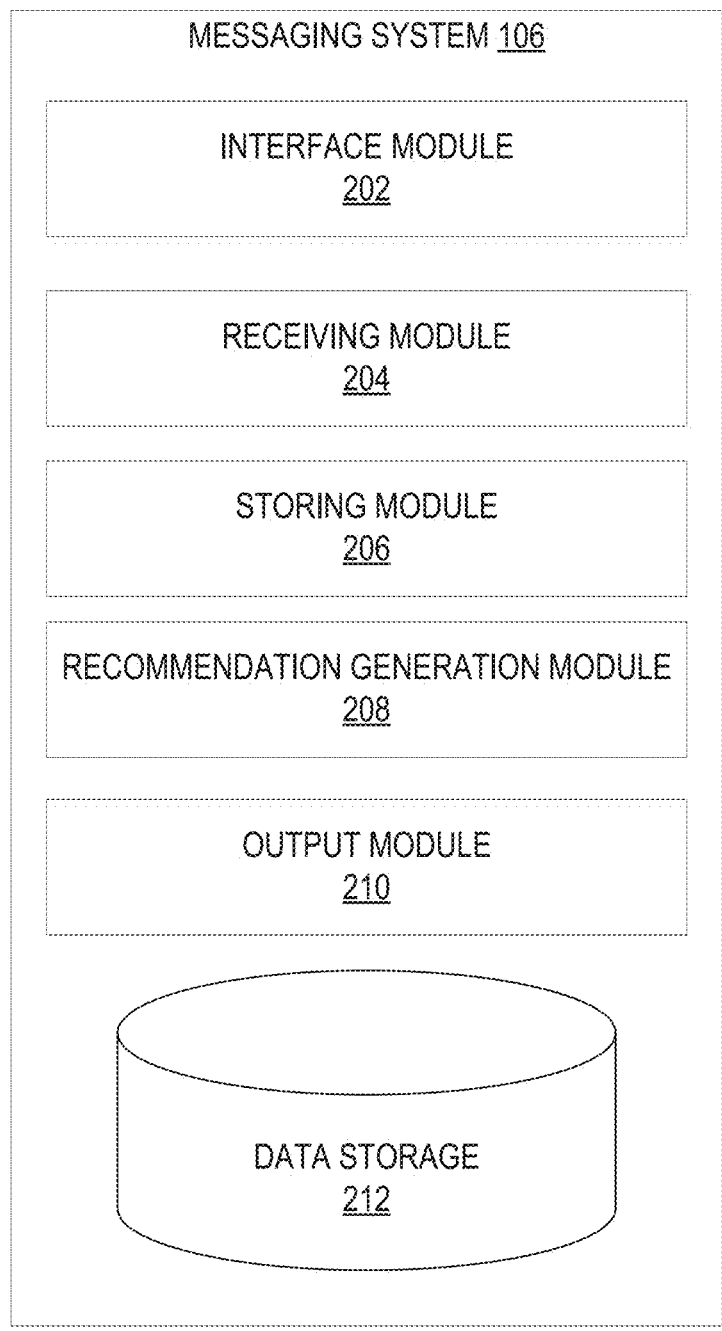
FIG. 2 is a block diagram of the messaging system, according to some example embodiments.

FIG. 2 is a block diagram of the messaging system 106, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the messaging system 106 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, the messaging system 106 includes an interface module 202, a receiving module 204, a storing module 206, a recommendation generation module 208, an output module 210, and a data storage 212. The interface module 202 provides a messaging interface that enables users to initiate and participate in communication sessions with other users. For example, the messaging interface includes user interface elements (e.g., buttons, scrollbars, text fields, etc.) that enable a user to select users and draft messages to initiate and participate in a communication session. Further, the messaging interface presents the users with a listing of available contacts to include in a communication session. The messaging interface also presents the user with a listing of existing communication sessions, which a user can select from to read the previous messages transmitted as part of the communication session as well as to draft and send new messages as part of the communication session.

The receiving module 204 receives messages that are being transmitted as part of a communication session. The messages are received from the client device 102, 104 of an originating user and intended for one or more other client devices 102, 104 of recipient users in the communication session. For example, a user may use the client device 102 to generate and transmit a message to the client device 104 of another user as part of a communication session. The message is initially received by the receiving module 204 of the messaging system 106. The received messages may include metadata, such as a timestamp indicating the time at which the message was transmitted, identifiers identifying the source and/or destination client devices 102, 104, identifiers identifying the source and/or destination users, an identifier identifying the communication session, etc.

The storing module 206 stores message data consisting of the received messages along with associated metadata in the data storage 212. In some embodiments, the storing module 206 anonymizes the message data to protect the privacy of the users. For example, the storing module 206 removes names and other personal information from the message data. The storing module 206 may also store the message data for a limited period of time, after which the message data is deleted. In some embodiments, a user is allowed to opt in or opt out of having their message data stored by the storing module. Accordingly, users that do not want to have their message data stored can opt out, resulting in the storing module 206 not storing their message data The recommendation generation module 208 generates recommended responses based on a received message, the historical message data stored in the data storage 212, user profile data, and/or contextual data. As explained above, the historical message data stored in the data storage 212 includes messages that were transmitted between client devices 102, 104 as part of previous communication sessions, as well as metadata describing the messages, such as the order in which the messages were sent, the originating and destination client devices, etc. The recommendation generation module 208 uses the historical message data to generate a statistical model, such as a shallow embedding model, which is used to determine recommended responses based on a received message. For example, upon receiving a message from client device 102 that is intended for client device 104 as part of a communication session, the recommendation generation module 208 uses the received message as input in the statistical model, which results in a set of candidate responses to the message.

The set of candidate responses is generated from historical message data gathered from messages transmitted between a large pool of users, meaning that the candidate responses include responses that the recipient user may not commonly use in conversation. Further, the set of candidate responses may be rather large, and thus selecting recommended responses from the set of candidate responses may be resource intensive and cause undesired latency. To alleviate these issues, the recommendation generation module 208 filters the set of candidate responses based on a personalized vocabulary determined for the recipient user. That is, the set of candidate response is filtered to remove candidate responses that the recipient is not likely to use in conversation. This reduces the size of the set of candidate responses and provides a much higher quality set of candidate responses that include responses that the recipient is likely to use in conversation.

The recommendation generation module 208 generates the personalized vocabulary for a user based on user profile data for the user. As explained earlier, the functionality of the recommendation generation module 208 may be incorporated into an online service 108 that maintains user profiles for users of the online service 108. Each user profile maintains data describing a corresponding user of the online service 108. For example, the user profile maintains data such as the user's gender, occupation, address, employer, etc. Additionally, a user's profile may maintain an activity log of the user's actions, including a log of text (e.g., articles, messages, comments, content, etc.) that the user has either authored or read through use of the online service 108. The user profile may also maintain a log of the recipient of any messages authored by the user associated with the user profile.

The recommendation generation module 208 communicates with the online service 108 to access a user's profile and gather data that the recommendation generation module 208 uses to generate the personalized vocabulary for the user. For example, the recommendation generation module 208 gathers text authored by and/or read by the user to identify words that are commonly used in the text. For example, the recommendation generation module 208 counts the number of occurrences of uniquely used words to identify the words that are most commonly used in the text. The recommendation generation module 208 uses these commonly used words to generate the personalized vocabulary for the user. For example, the recommendation generation module 208 determines a set of words that occurred a high number or times, which are assumed to be words that the user would commonly use in conversation.

The recommendation generation module 208 uses these commonly used words to filter the set of candidate responses. For example, the recommendation generation module 208 removes candidate responses that include words that did not occur a threshold number of times, percentage of times, etc., in the analyzed text. As another example, the recommendation generation module 208 selects the candidate responses that include words that occurred at least a threshold number of time, percentage of times, etc., in the analyzed text. Filtering the candidate responses based on words that the user commonly uses and/or does not use results in a smaller resulting data set that is much higher quality. That is, the remaining candidate responses are responses that the user is likely to use in response to a received message.

The recommendation generation module 208 may also filter the set of candidate responses based on other contextual factors. For example, a user may use a different vocabulary based on the person they are speaking to (e.g., spouse vs. boss), the communication channel they are using (e.g., email vs. text), the gender of the person they are speaking to, the age of the person they are speaking to, the relationship between the users (e.g., client or boss), etc. Accordingly, the recommendation generation module 208 gathers contextual data and filters the set of candidate responses based on words that were commonly used under similar circumstances. For example, the recommendation generation module 208 gathers user profile data for the participants of the communication session from the online service 108, and filters the set of candidate responses based on contextual factors determined from the user profile data. The resulting filtered set of candidate response includes responses that the user would commonly user under similar circumstances.

The recommendation generation module 208 then selects a set of recommended responses from the filtered set of candidate responses, which can be provided to a user. The functionality of the recommendation generation module 208 is discussed in greater detail below in relation to FIG. 3.

The output module 210 transmits received messages and a set of recommended responses to a recipient user's client device (e.g., client device 104) as part of a communication session. The recipient user can use their client device (e.g., client device 104) to select a recommended response to quickly and easily respond to the received message. For example, the user of client device 104 can provide a single input (e.g., tapping one of the recommended responses) to provide a response to the user of client device 102, rather than typing out a reply message letter by letter and then selecting to send the message. As described above, the messaging system 106, upon receiving a user selection of one of the recommended responses from client device 104, transmits the recommended response to client device 102 as part of the communication session. Additionally, the recommendation generation module may generate and provide client device 102 with a set of recommended responses.

Figure 3:
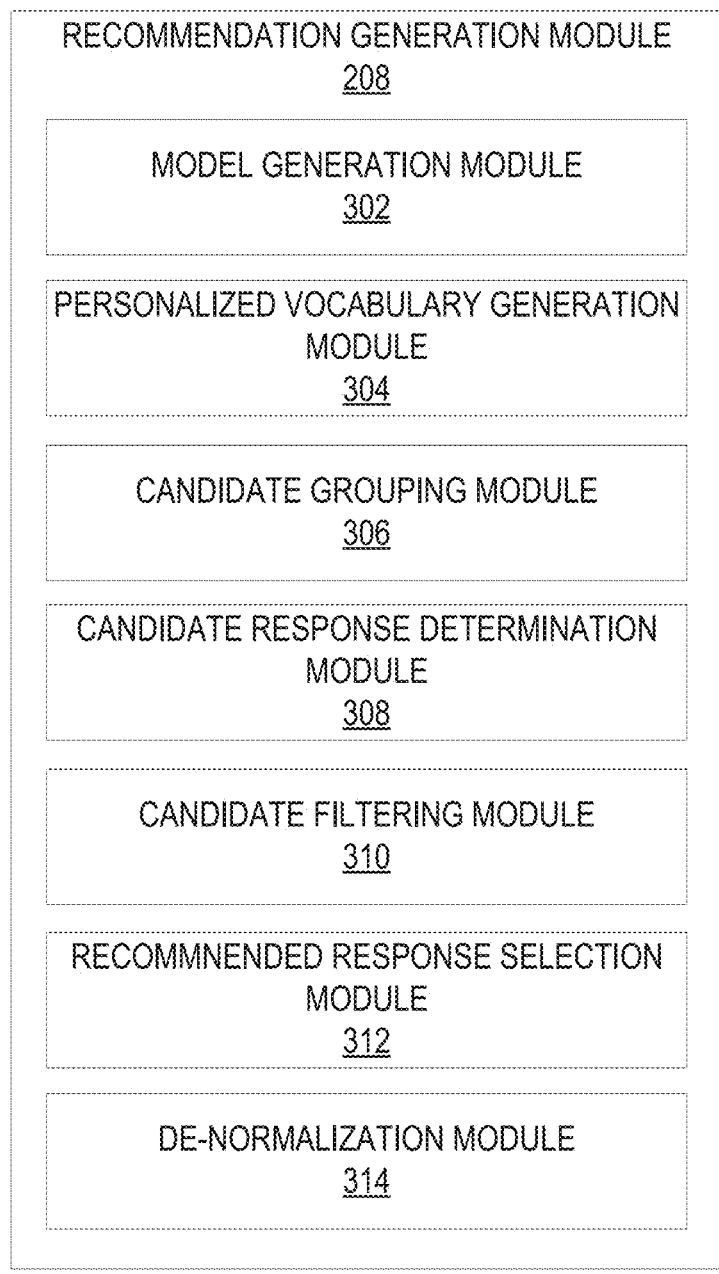
FIG. 3 is a block diagram of the recommendation generation module, according to some example embodiments.

FIG. 3 is a block diagram of the recommendation generation module 208, according to some example embodiments. To avoid obscuring the inventive subject matter with unnecessary detail, various functional components (e.g., modules) that are not germane to conveying an understanding of the inventive subject matter have been omitted from FIG. 3. However, a skilled artisan will readily recognize that various additional functional components may be supported by the recommendation generation module 208 to facilitate additional functionality that is not specifically described herein. Furthermore, the various functional modules depicted in FIG. 3 may reside on a single computing device or may be distributed across several computing devices in various arrangements such as those used in cloud-based architectures.

As shown, the recommendation generation module 208 includes a model generation module 302, a personalized vocabulary generation module 304, a candidate grouping module 306, a candidate response determination module 308, a candidate filtering module 310, a recommended response selection module 312, and a de-normalization module 314. The model generation module 302 generates a statistical model (e.g., a shallow embedding model) based on historical message data stored in the data storage 212. The statistical model receives, as input, a message transmitted as part of a communication session, and returns a set of candidate responses that are commonly used in response to the message.

To generate the statistical model, the model generation module 302 gathers the historical message data from the data storage 212 and identifies the previous messages transmitted during previous communication sessions. The model generation module 302 normalizes each of the previous messages by, for example, replacing personalized terms (e.g., names, addresses, etc.) with placeholders, removing or normalizing punctuation, etc. Normalizing the data in this manner allows the model generation module 302 to identify multiple instances of a unique message. For example, the message "Hi Bob" and "Hi Frank" would both be normalized to "Hi [First Name]," which the model generation module 302 will identify as being two instances of the same message.

After the messages have been normalized, the model generation module 302 identifies a set of the normalized messages that occurred at least a threshold number of times. This provides the model generation module 302 with commonly used responses, which the model generation module 302 designates as a set of available candidate responses that the model generation module 302 can choose from to provide recommended responses to users. To determine the proper context in which to recommend the candidate responses, the model generation module 302 identifies, from the historical message data, messages that preceded each instance of the candidate responses. The model generation module 302 uses these preceding messages along with their corresponding responses to generate the statistical model.

The resulting statistical model returns a set of candidate responses from the available candidate responses based on a provided message input. The set of candidate responses is a subset of the available candidate responses that are determined to be commonly used in responses that are the same or similar to the input message. The functionality of the model generation module 302 is discussed in greater detail below in relation to FIG. 4.

The personalized vocabulary generation module 304 generates a personalized vocabulary for a user. A personalized vocabulary is a listing of words that the user is likely to use and/or not use in conversation. To generate the personalized vocabulary for a user, the personalized vocabulary generation module 304 gathers data from the user's profile maintained by the online service 108. The user profile data may include data describing the specific user, such as the user's age, sex, address, employer, education level, etc. The user profile data may also include an activity log of text that the user has either authored or read. For example, the text includes, messages, articles, comments, replies, emails, etc., that the user has either read or authored. The activity log also includes metadata describing the text, such as data identifying the recipient of a message, the day/time the messages was read or authored, the communication channel associated with the text (e.g., email, post, direct message, etc.), etc.

The personalized vocabulary generation module 304 gathers text based on the activity log in the user's profile and analyzes the text to identify words that are commonly used in the text. For example, the personalized vocabulary generation module 304 counts the number of times each unique word occurs in the text. The personalized vocabulary generation module 304 determines the likelihood that a user would use a word based on the number of times the word occurs in the text. For example, the personalized vocabulary generation module 304 determines that the user is likely to use words that occur a relatively high number of times, and that the user is less likely to use words that occur a relatively low number of times.

The personalized vocabulary generation module 304 may limit this process to certain types of meaningful words and filter out or not count commonly used words. For example, the personalized vocabulary generation module 304 may not count universally used words such as article words (e.g., a, an, the, etc.), and count only words in which there is variation on use between users. For example, when using affirmative words, some users may use 'yes,' whereas others may use a more informal term such as 'ya.' Accordingly, the resulting personalized vocabulary will be based on words in which there is variation in use between users.

In addition to determining a general personalized vocabulary for the user based on the number of times each word occurs in the text, the personalized vocabulary generation module 304 may also generate contextual personalized vocabularies based on the number of times words occur under different contextual circumstances. For example, the personalized vocabulary generation module 304 uses metadata associated with the text, as well as profile data gathered for users associated with the text (e.g., recipient user and author), to categorize text into different contextual categories. The contextual categories may include any of a variety of contextual categories, such as text transmitted between co-workers, text transmitted to a work superior (e.g., boss), text transmitted to a work subordinate (e.g., employee, direct report), text transmitted to the same sex, text transmitted to the opposite sex, etc.

In some instances, the personalized vocabulary generation module 304 may not have a large enough data set to generate a meaningful personalized vocabulary for a user. For example, the user may have recently created a user account with the online service 108 and has not yet had adequate time to read or author much text. In this type of situation, the personalized vocabulary generation module 304 may utilize text that was read or authored by other users that are determined to be similar to the user. For example, the personalized vocabulary generation module 304 may search for users that are in a similar or same demographic category as the user, as based on user profile data of the user. Users in a similar or same demographic category are users that share the same and or similar user profile data, such as occupation, sex, geographic location, age, etc. The personalized vocabulary generation module 304 uses text that has been read or authored by similar users as substitutes for the personalized vocabulary for the user until the user has authored and/or read a sufficient amount of text. The personalized vocabulary generation module 304 is discussed in greater detail below in relation to FIG. 5.

The candidate grouping module 306 groups similar candidate responses into candidate groups. Multiple candidate responses may have similar meanings. For example, the terms 'yes,' 'yeah,' 'yup,' 'sure,' etc., all have essentially the same meaning. Providing a user with multiple recommended responses with similar meanings may be redundant and provide the user with limited response options. Accordingly, it is preferable to provide the user with recommended responses that have a variety of meanings. For example, providing the user with recommended responses 'yes,' 'maybe,' and 'no' provides the user with three options that each have a distinct meaning from the others, whereas the recommended responses 'yes,' 'yup,' and 'sure' provide the user with three options that all have a single meaning.

To this end, the candidate grouping module 306 groups each of the candidate responses from the available candidate responses into a candidate group based on the meaning of the candidate response. As a result, each candidate response is included in a candidate group with a similar meaning.

The candidate response determination module 308 determines a set of candidate responses based on a received message. The received message is a message received as part of a communication session. To accomplish this, the candidate response determination module 308 uses the received message as input in the statistical model generated by the model generation module 302. As explained above, the statistical model returns a set of candidate responses that are commonly used in response to a received message. The set of candidate responses are a subset of the available candidate responses. In some embodiments, the set of candidate responses returned by the statistical model are ranked based on how likely or commonly each candidate response is used in response to the input message.

The candidate filtering module 310 filters the set of candidate responses based on the user's personalized vocabulary. That is, the candidate filtering module 310 removes candidate responses that include words that are not commonly used by the user and/or selects candidate responses that include words that are commonly used by the user. For example, the candidate filtering module 310 selects responses that include one or more words that occurred at least a threshold number of times, a threshold percentage of time, were above a threshold percentile for usage, etc. Likewise, the candidate filtering module 310 removes candidate responses that include words that did not occur at least a threshold number of times, a threshold percentage of the time, were below a threshold percentile for usage, etc.

The candidate filtering module 310 may filter the set of candidate responses based on contextual data, such as the relationship between the users, gender of recipient, communication channel, etc. In this type of embodiments, the candidate filtering module 310 gathers contextual data and determines an appropriate contextual category of personalized vocabulary of the user to use to filter the set of candidate responses.

The candidate filtering module 310 may select or remove candidate responses from each candidate group based on the user's personalized vocabulary. As a result, candidate responses in each candidate group that the user is not likely to use in conversation will be removed, thereby leaving responses that the user is likely to use in conversation.

Filtering the set of candidate responses results in a filtered set of candidate responses. The filtered set of candidate responses includes less responses than the set of candidate responses (i.e., the filtered set of candidate responses is a subset of the set of candidate responses). As a result, the recommendation generation module 208 reduces the set of candidates from which responses are selected, thereby reducing resource usage and associated system latency. This increases overall computing system performance.

The recommended response selection module 312 selects a set of recommended responses from the filtered set of candidate responses based on a set of candidate selection rules. The set of candidate selection rules dictate how the set of recommended responses should be selected from the filtered set of candidate responses. For example, the set of candidate selection rules may dictate the number of candidate responses that should be selected as recommended responses, such as three candidate responses. As another example, the set of candidate selection rules may dictate that the top rated candidate responses be selected. As another example, the set of candidate selection rules may dictate a maximum limit on the number of candidate responses that can be selected from a candidate group. For example, the candidate selection rules may dictate that only one candidate response can be selected from each candidate group. This type of candidate selection rule ensures that a user is provided with recommended responses with a variety of meanings. In some embodiments, the candidate selection rules can dictate a minimum number of candidate groups from which a candidate response should be picked, such as at least two candidate groups. As a result, the recommended responses provided to the user will include at least two responses with different meanings.

The de-normalization module 314 de-normalizes recommended responses prior to the recommended response being provided to the user. De-normalizing a recommended response includes replacing a placeholder included in the recommended response with personalized data. For example, a placeholder such as [first name] can be replaced with the recipient user's first name. As another example, a placeholder such as [date] can be replaced with the current date. As a result, the recommended messages provided to the user will be personalized based on the communication session and current context (e.g., date, time, etc.).

Figure 4:
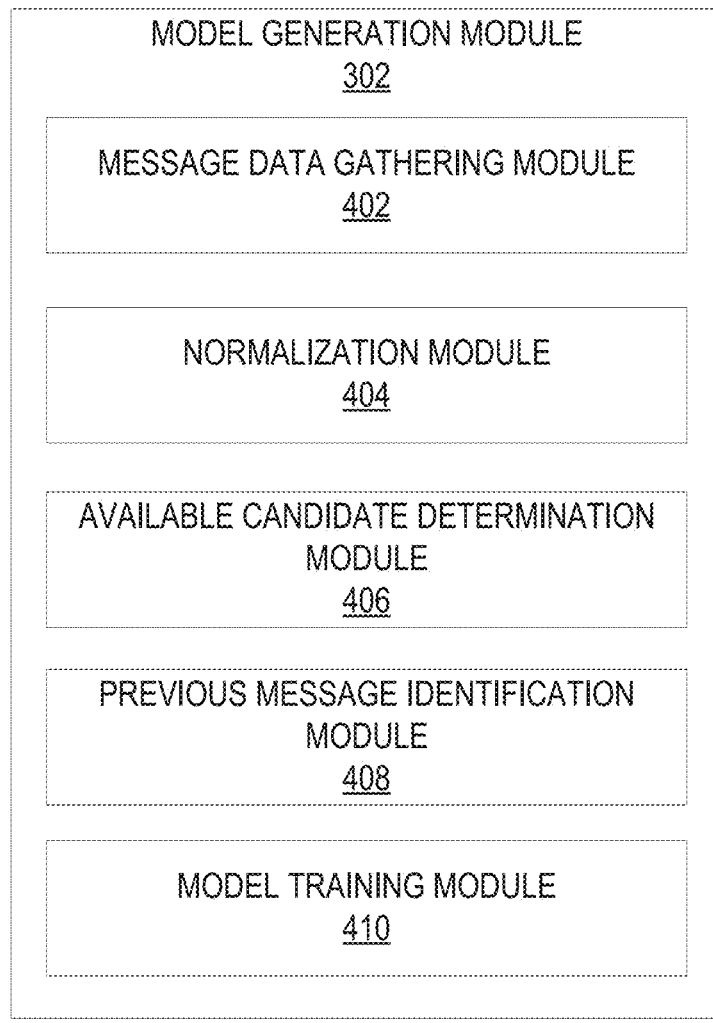
FIG. 4 is a block diagram of the model generation module, according to some example embodiments.

FIG. 4 is a block diagram of the model generation module 302, according to some example embodiments. To avoid obscuring the inventive subject matter with unnecessary detail, various functional components (e.g., modules) that are not germane to conveying an understanding of the inventive subject matter have been omitted from FIG. 4. However, a skilled artisan will readily recognize that various additional functional components may be supported by the model generation module 302 to facilitate additional functionality that is not specifically described herein. Furthermore, the various functional modules depicted in FIG. 4 may reside on a single computing device or may be distributed across several computing devices in various arrangements such as those used in cloud-based architectures.

As shown, the model generation module 302 includes a message data gathering module 402, a normalization module 404, an available candidate determination module 406, a previous message identification module 408, and a model training module 410. The message data gathering module 402 gathers historical message data from the data storage 212. The historical message data includes messages that were transmitted as part of previous communication sessions, as well as an order in which the messages were transmitted.

The normalization module 404 normalizes the messages from the historical message data. Normalizing the messages may include multiple steps. For example, normalizing the message data includes replacing personalized data with placeholders. Personalized data is data that is unique to the context of the communication session. Examples of personalized data are names, dates, email addresses, addresses, phone numbers, URLs, etc. The normalization module 404 identifies these types of personalized terms on the messages and replaces the terms with placeholders indicating the type of term that was replaced. For example, a user's first name is replaced with a placeholder such as [first name]. Likewise, a date is replaced with a placeholder such as [current date].

In addition to replacing personalized terms with placeholders, the normalization module 404 further normalizes the messages to remove unnecessary characters, spacing, etc. For example, the normalization module 404 removes additional white spaces between words, additional or repeat punctuation, etc.

The available candidate determination module 406 determines the set of available candidate responses that are commonly used by users in communication sessions. To accomplish this, the available candidate determination module 406 determines a number of occurrences of each unique normalized message generated by the normalization module 404. The number of occurrences indicates a number of times that the normalized message was used in communication sessions. The available candidate determination module 406 then compares the number of times that each unique normalized message occurred to a predetermined threshold number of occurrences, such as 1000 occurrences. The available candidate determination module 406 adds each normalized message that occurred at least the threshold number of times to the set of available candidate responses. As a result, the set of available candidate responses only includes responses that were used often or commonly during communication sessions, and messages that were not used commonly are not included in the set of available candidate responses.

The previous message identification module 408 identifies messages that were transmitted preceding each instance (i.e., occurrence) of a candidate message in the historical message data. These preceding messages provide context regarding when and in response to what type of message each candidate response is commonly used. The model training module 410 uses these preceding messages to train the statistical model.

Figure 5:
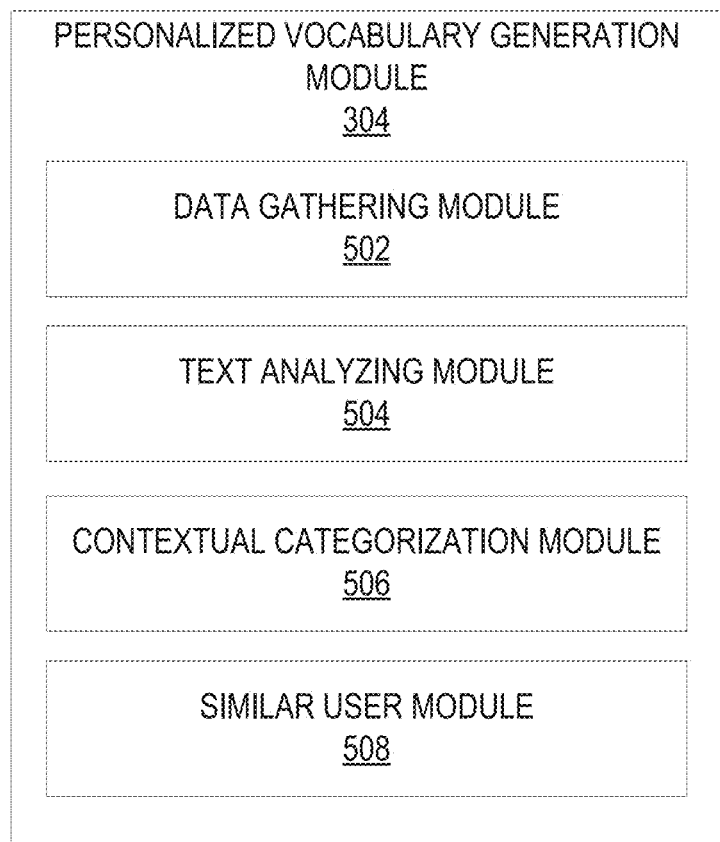
FIG. 5 is a block diagram of the personalized vocabulary generation module, according to some example embodiments.

FIG. 5 is a block diagram of the personalized vocabulary generation module 304, according to some example embodiments. To avoid obscuring the inventive subject matter with unnecessary detail, various functional components (e.g., modules) that are not germane to conveying an understanding of the inventive subject matter have been omitted from FIG. 5. However, a skilled artisan will readily recognize that various additional functional components may be supported by the personalized vocabulary generation module 304 to facilitate additional functionality that is not specifically described herein. Furthermore, the various functional modules depicted in FIG. 5 may reside on a single computing device or may be distributed across several computing devices in various arrangements such as those used in cloud-based architectures.

The personalized vocabulary generation module 304 generates a personalized vocabulary for a user. A personalized vocabulary is a listing of words that the user is likely to use and/or not use in conversation. As shown, the personalized vocabulary generation module 304 includes a data gathering module 502, a text analyzing module 504, a contextual categorization module 506, and a similar user module 508.

The data gathering module 502 gathers data used to generate a personalized vocabulary for a user. The data gathering module 502 gathers the data from a user's profile maintained by an online service 108. The messaging system 106 may be incorporated into the online service 108. For example, the messaging system 106 may be an instant messaging function provided by an online service 108, such as a social networking site.

The online service 108 allows users to create a user profile to access functionality of the online service 108. Once a user profile is created, the online service 108 stores information associated with the user in the user's user profile. The stored data includes data describing the user, such as the user's name, address, gender, age, occupation, education level, etc. The stored data also includes an activity log of the user's actions while using the online service 104. For example, the activity log includes a listing of text that the user has either authored or read. For example, the text includes, messages, articles, comments, replies, emails, etc., that the user has either read or authored. The activity log also includes metadata describing the text, such as data identifying the recipient of a message, the day/time the messages was read or authored, the communication channel associated with the text (e.g., email, post, direct message, etc.), etc.

The data gathering module 502 communicates with the online service 108 to access the users profile and access data stored in the user's profile. This includes the data describing the user as well as the activity log. In some instances, the text authored and/or read by the user may be accessed from the online service 108, in which case the data gathering module 502 gathers the text directly from the online service 108. Alternatively, the data gathering module 502 may access some of the text from other web services. For example, the activity log may include links, URLs, etc., to text (e.g., articles) that the user authored or read that are hosted by another web service. Accordingly, the data gathering module 502 uses the provided links to access the text from the appropriate web service. The data gathering module 502 may also access user profile data for other users, such as users that read text authored by the user, received messages from the user, commented on text authored by the user, etc. The data gathering module 502 uses the metadata included in the activity log to identify these users and accesses their user profile data from the online service 108.

The text analyzing module 504 analyzes text authored or read by the user to identify words that are commonly used in the text. For example, the text analyzing module 504 counts the number of times each unique word occurs in the text.

The text analyzing module 504 may limit this process to certain types of meaningful words and filter out or not count commonly used words. For example, the text analyzing module 504 may not count universally used words such as article words (e.g., a, an, the, etc.), and count only words in which there is variation on use between users. For example, when using affirmative words, some users may use 'yes,' whereas others may use a more informal term such as 'ya.' Accordingly, the text analyzing module 504 will count words in which there is variation between use between users, rather than words that are commonly used by all users and for which there are no alternatives.

The text analyzing module 504 determines a personalized vocabulary for a user based on the number of times each word occurs in the analyzed text. That is, the text analyzing module 504 determines the likelihood that a user would use a word based on the number of times the word occurs in the text. For example, the text analyzing module 504 determines that the user is likely to use words that occur a relatively high number of times, and that the user is less likely to use words that occur a relatively low number of times. The resulting personalized vocabulary is a general personalized vocabulary for the user, meaning that the personalized vocabulary indicates words that the user is generally likely to use and/or not use in conversation, regardless of context.

In contrast, the contextual categorization module 506 generates contextual personalized vocabularies for a user based on the number of times words occur under different contextual circumstances. For example, the contextual categorization module 506 uses metadata associated with the text, as well as profile data gathered for users associated with the text (e.g., recipient user and author), to categorize text into different contextual categories. The contextual categories may include any of a variety of contextual categories, such as text transmitted between co-workers, text transmitted to a work superior (e.g., boss), text transmitted to a work subordinate (e.g., employee, direct report), text transmitted to the same sex, text transmitted to the opposite sex, etc.

In some instances, the personalized vocabulary generation module 304 may not have a large enough data set for a user to generate a meaningful personalized vocabulary for a user. For example, the user may have recently created a user account with the online service 108 and has not yet had adequate time to read or author much text. In this type of situation, the personalized vocabulary generation module 304 may utilize text that was read or authored by other users that are determined to be similar to the user. The similar user module 508 identifies similar users that are in a similar or same demographic category as the user, as based on user profile data of the users. Users in a similar or same demographic category are users that share the same and or similar user profile data, such as occupation, sex, geographic location, age, etc. The similar user module 508 provides data identifying the similar users to the data gathering module 502, which gathers user profile data for the similar users. The text analyzing module 504 and/or contextual categorization module 506 determine a personalized vocabulary for the user based on the received text and user profile data of the similar users.

Figure 6:
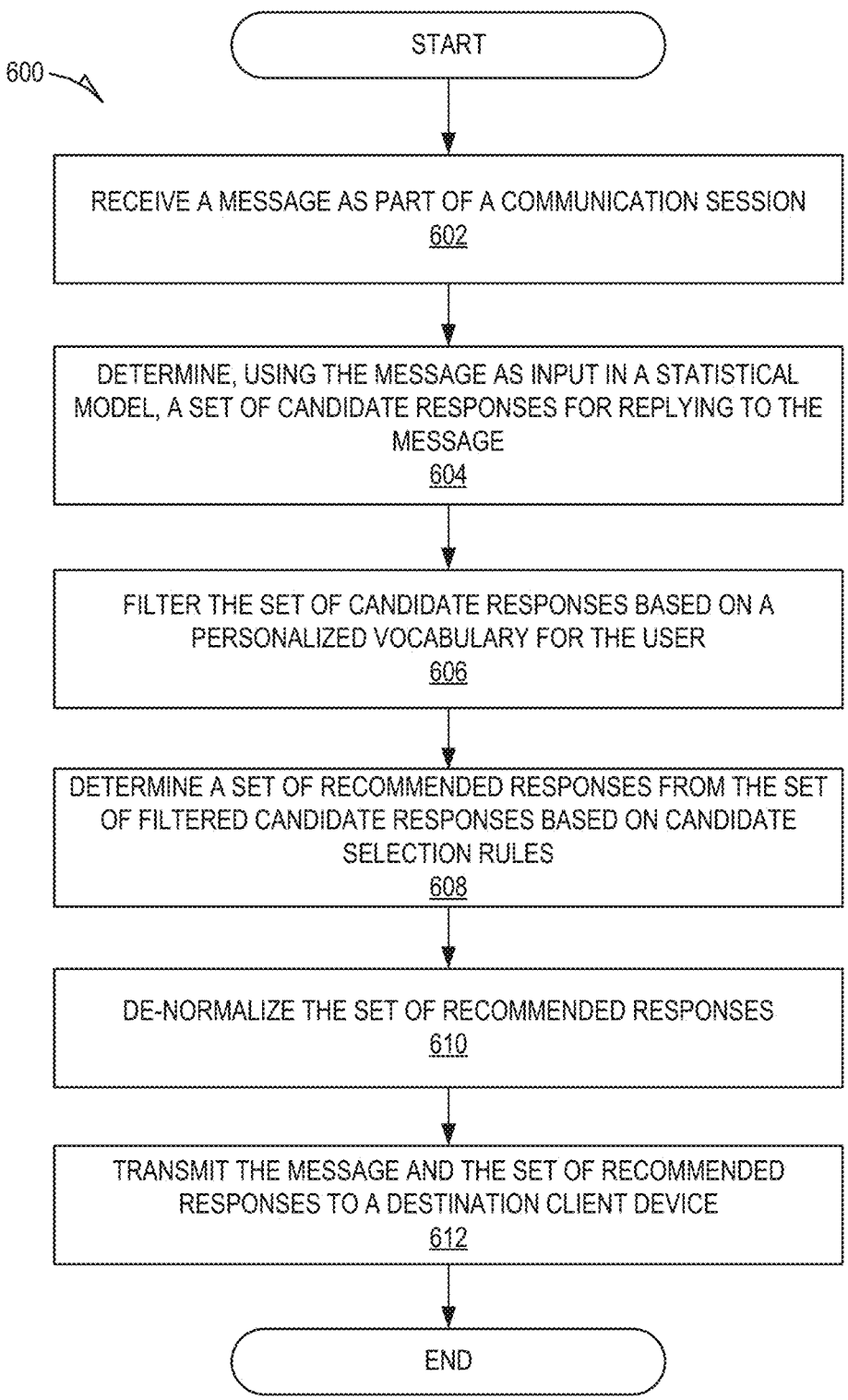
FIG. 6 is a flowchart showing an example method of generating recommended responses based on historical message data and a personalized vocabulary, according to certain example embodiments.

FIG. 6 is a flowchart showing an example method 600 of generating recommended responses based on historical message data and a personalized vocabulary, according to certain example embodiments. The method 600 may be embodied in computer readable instructions for execution by one or more processors such that the operations of the method 600 may be performed in part or in whole by the messaging system 106; accordingly, the method 600 is described below by way of example with reference thereto. However, it shall be appreciated that at least some of the operations of the method 600 may be deployed on various other hardware configurations and the method 600 is not intended to be limited to the messaging system 106.

At operation 602, the receiving module 204 receives a message as part of a communication session. The messages are received from the client device 102, 104 of an originating user and intended for one or more other client devices 102, 104 of recipient users in the communication session. For example, a user may use the client device 102 to generate and transmit a message to the client device 104 of another user as part of a communication session. The message is initially received by the receiving module 204 of the messaging system 106. The received messages may include metadata, such as a timestamp indicating the time at which the message was transmitted, identifiers identifying the source and/or destination client devices, an identifier identifying the communication session, etc.

At operation 604, the candidate response determination module 308 determines, using the message as input in a statistical model, a set of candidate responses for replying to the message. To accomplish this, the candidate response determination module 308 uses the received message as input in the statistical model generated by the model generation module 302. As explained above, the statistical model returns a set of candidate responses that are commonly used in response to a received message. The set of candidate responses are a subset of the available candidate responses. In some embodiments, the set of candidate responses returned by the statistical model are ranked based on how likely or commonly each candidate response is used in response to the input message.

At operation 606, the candidate filtering module 310 filters the set of candidate responses based on the user's personalized vocabulary. That is, the candidate filtering module 310 removes candidate responses that include words that are not commonly used by the user and/or selects candidate responses that include words that are commonly used by the user. For example, the candidate filtering module 310 selects responses that include one or more words that occurred at least a threshold number of times, a threshold percentage of time, were above a threshold percentile for usage, etc. Likewise, the candidate filtering module 310 removes candidate responses that include words that did not occur at least a threshold number of times, a threshold percentage of the time, were below a threshold percentile for usage, etc.

The candidate filtering module 310 may filter the set of candidate responses based on contextual data, such as the relationship between the users, gender of recipient, communication channel, etc. In this type of embodiment, the candidate filtering module 310 gathers contextual data and determines an appropriate contextual category of personalized vocabulary of the user to use to filter the set of candidate responses.

The candidate filtering module 310 may select or remove candidate responses from each candidate group based on the user's personalized vocabulary. As a result, candidate responses in each candidate group that the user is not likely to use in conversation will be removed, leaving responses that the user is likely to use in conversation.

Filtering the set of candidate responses results in a filtered set of candidate responses. The filtered set of candidate responses includes fewer responses than the set of candidate responses (i.e., the filtered set of candidate responses is a subset of the set of candidate response). As a result, the recommendation generation module 208 reduces the set of candidates from which responses are selected, thereby reducing resource usage and associated system latency. This increases overall computing system performance.

At operation 608, the recommended response selection module 312 determines a set of recommended responses from the filtered set of candidate responses based on candidate selection rules. The set of candidate selection rules dictate how the set of recommended responses should be selected from the filtered set of candidate responses. For example, the set of candidate selection rules may dictate the number of candidate responses that should be selected as recommended responses, such as three candidate responses. As another example, the set of candidate selection rules may dictate that the top rated candidate selection rules be selected. As another example, the set of candidate selection rules may dictate a maximum limit on the number of candidate responses that can be selected from a candidate group. For example, the candidate selection rules may dictate that only one candidate response can be selected from each candidate group. This type of candidate selection rule ensures that a user is provided with recommended responses with a variety of meanings. In some embodiments, the candidate selection rules can dictate a minimum number of candidate groups from which a candidate response should be picked, such as at least two candidate groups. As a result, the recommended responses provided to the user will include at least two responses with different meanings.

At operation 610, the de-normalization module 314 de-normalizes the set of recommended responses. De-normalizing a recommended response includes replacing a placeholder included in the recommended response with personalized data. For example, a placeholder such as [first name] can be replaced with the recipient user's first name. As another example, a placeholder such as [date] can be replaced with the current date. As a result, the recommended messages provided to the user will be personalized based on the communication session and current context (e.g., date, time, etc.).

At operation 612, the output module 210 transmits the message and the set of recommended responses to a destination client device. The recipient user can use their client device (e.g., client device 104) to select a recommend response to quickly and easily respond to the received message. For example, the user of client device 104 can provide a single input (e.g., tapping one of the recommended responses) to provide a response to the user of client device 102, rather than typing out a reply message letter by letter and then selecting to send the message.

Figure 7:
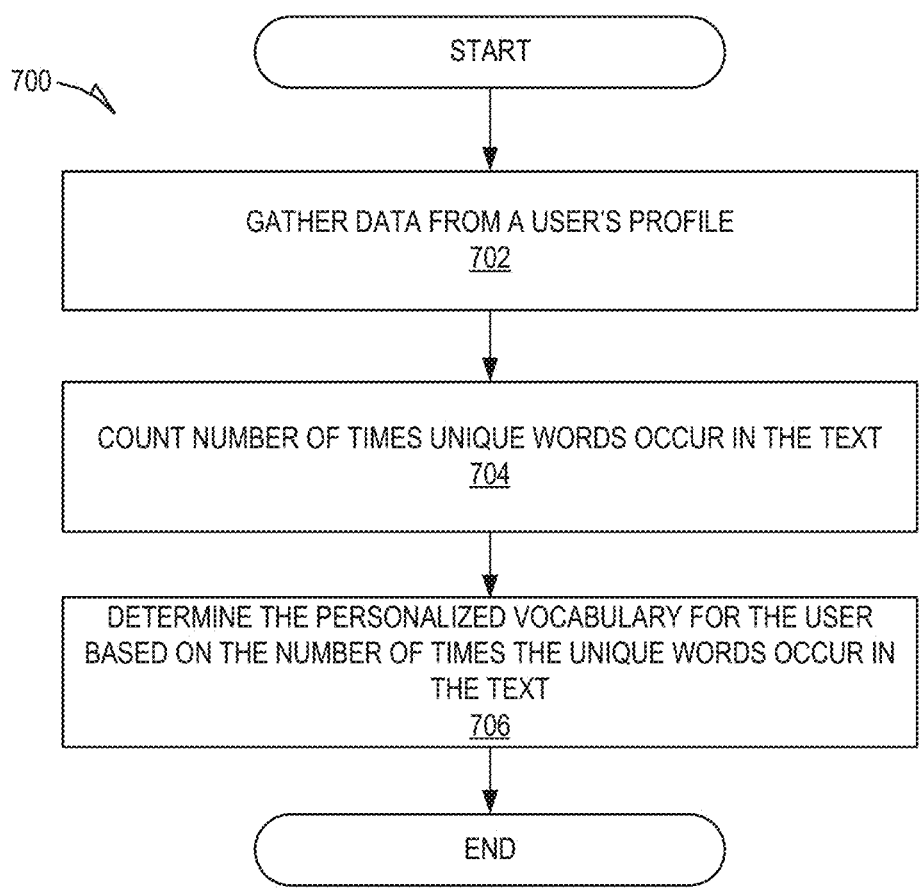
FIG. 7 is a flowchart showing an example method of generating a personalized vocabulary for a user, according to certain example embodiments.

FIG. 7 is a flowchart showing an example method 700 of generating a personalized vocabulary for a user, according to certain example embodiments. The method 700 may be embodied in computer readable instructions for execution by one or more processors such that the operations of the method 700 may be performed in part or in whole by the personalized vocabulary generation module 304; accordingly, the method 700 is described below by way of example with reference thereto. However, it shall be appreciated that at least some of the operations of the method 700 may be deployed on various other hardware configurations and the method 700 is not intended to be limited to the personalized vocabulary generation module 304.

At operation 702, the data gathering module 502 gathers data from a user's profile. The data gathering module 502 gathers the data from a user's profile maintained by an online service 108. The messaging system 106 may be incorporated into the online service 108. For example, the messaging system 106 may be an instant messaging function provided by an online service 108, such as a social networking site.

The online service 108 allows users to create a user profile to access functionality of the online service 108. Once a user profile is created, the online service 108 stores information associated with the user in the user's user profile. The stored data includes data describing the user, such as the user's name, address, gender, age, occupation, education level, etc. The stored data also includes an activity log of the user's actions while using the online service 104. For example, the activity log includes a listing of text that the user has either authored or read. For example, the text includes, messages, articles, comments, replies, emails, etc., that the user has either read or authored. The activity log also includes metadata describing the text, such as data identifying the recipient of a message, the day/time the messages was read or authored, the communication channel associated with the text (e.g., email, post, direct message, etc.), etc.

The data gathering module 502 communicates with the online service 108 to access the user's profile and access data stored in the user's profile. This includes the data describing the user as well as the activity log. In some instances, the text authored and/or read by the user may be accessed from the online service 108, in which case the data gathering module 502 gathers the text directly from the online service 108. Alternatively, the data gathering module 502 may access some of the text from other web services. For example, the activity log may include links, URLs, etc., to text (e.g., articles) that the user authored or read that are hosted by another web service. Accordingly, the data gathering module 502 uses the provided links to access the text from the appropriate web service. The data gathering module 502 may also access user profile data for other users, such as users that read text authored by the user, received messages from the user, commented on text authored by the user, etc. The data gathering module 502 uses the metadata included in the activity log to identify these users and accesses their user profile data from the online service 108.

At operation 704, the text analyzing module 504 counts the number of times unique words occur in the text. The text analyzing module 504 counts the number of times unique words occur in the text to determine words that the user is likely to use in conversation. The text analyzing module 504 may limit this process to certain types of meaningful words and filter out or not count commonly used words. For example, the text analyzing module 504 may not count universally used words such as article words (e.g., a, an, the, etc.), and count only words in which there is variation on use between users. For example, when using affirmative words, some users may use 'yes,' whereas others may use a more informal term such as 'ya.' Accordingly, the text analyzing module 504 will count words in which there is variation between use between users, rather than words that are commonly used by all users and for which there are no alternatives.

At operation 706, the text analyzing module 504 determines the personalized vocabulary for the user based on the number of times the unique words occur in the text. That is, the text analyzing module 504 determines the likelihood that a user would use a word based on the number of times the word occurs in the text. For example, the text analyzing module 504 determines that the user is likely to use words that occur a relatively high number of times, and that the user is less likely to use words that occur a relatively low number of times. The resulting personalized vocabulary is a general personalized vocabulary for the user, meaning that the personalized vocabulary indicates words that the user is generally likely to use and/or not use in conversation, regardless of context.

Figure 8:
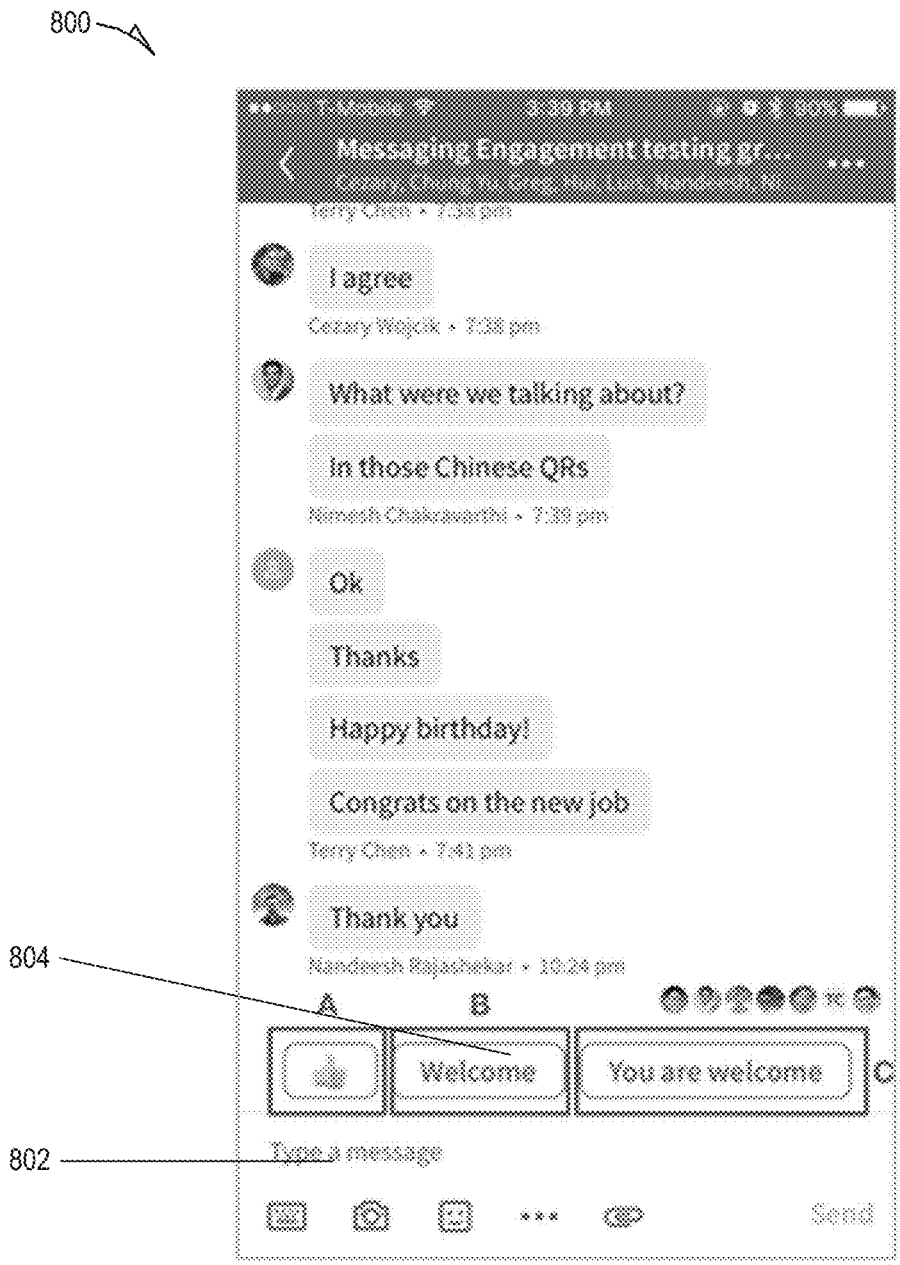
FIG. 8 is a screenshot of a messaging interface 800 including a set of recommended response messages, according to some example embodiments.

FIG. 8 is a screenshot of a messaging interface 800 including a set of recommended response messages, according to some example embodiments. As shown, the messaging interface shows a history of messages transmitted between multiple users as part of a communication session. As shown, the most recent message received as part of the communication session is the phrase 'Thank you.' The messaging interface includes a text field 802, which a user can utilize to respond to the received message. For example, the user can select the text field 802 and enter a response such as 'you're welcome.' The messaging interface also includes a set of three recommended replies 804, which a user can select from. As shown, the recommended replies 804 include a thumbs up emoticon, 'Welcome,' and 'You are welcome.' Rather than use the text field 802 to manually type out a response, the user can select one of the recommended replies 804 with a single input to respond to the message.

Software Architecture

Figure 9:
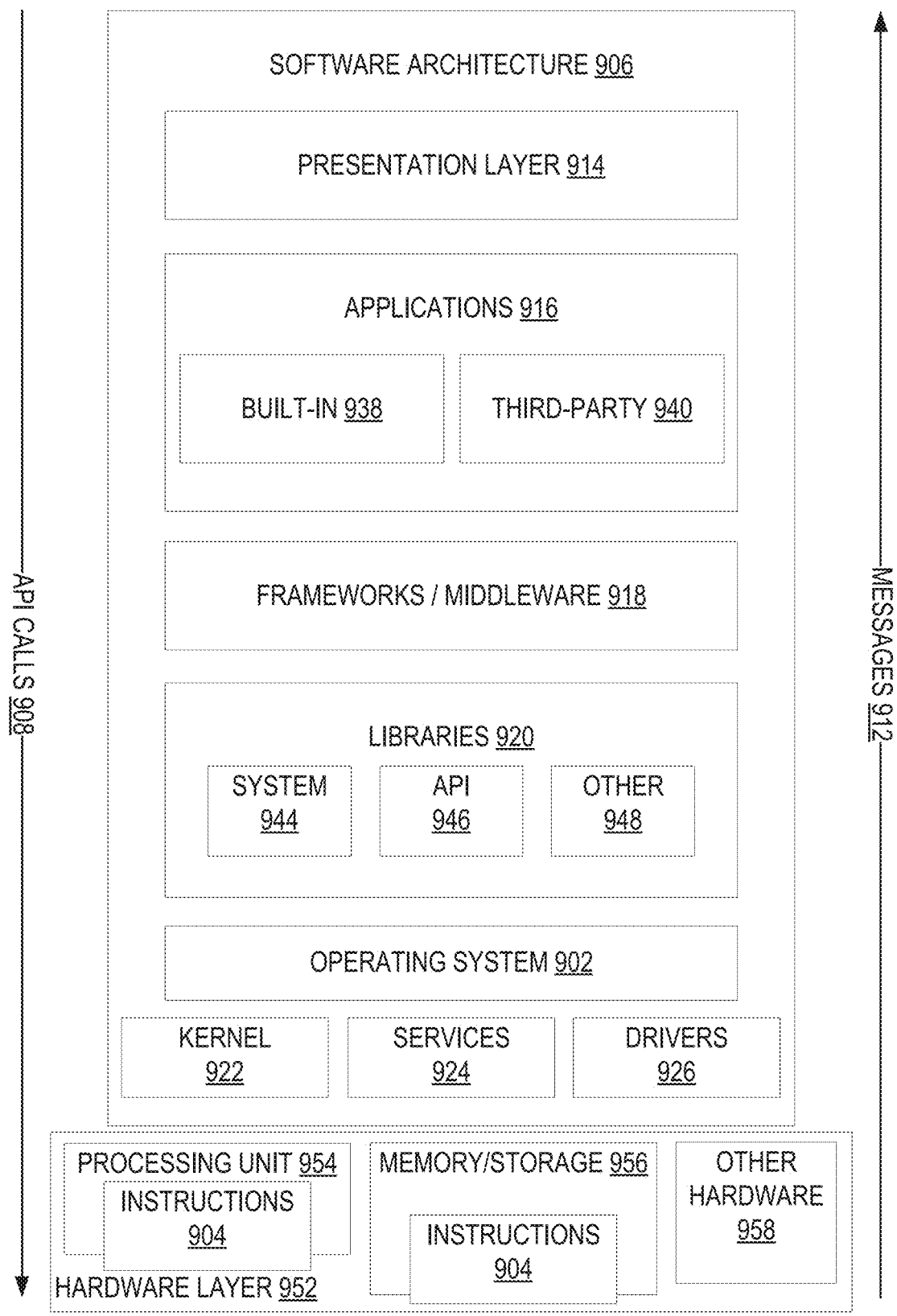
FIG. 9 is a block diagram illustrating a representative software architecture, which may be used in conjunction with various hardware architectures herein described.

FIG. 9 is a block diagram illustrating an example software architecture 906, which may be used in conjunction with various hardware architectures herein described. FIG. 9 is a non-limiting example of a software architecture 906 and it will be appreciated that many other architectures may be implemented to facilitate the functionality described herein. The software architecture 906 may execute on hardware such as machine 1000 of FIG. 10 that includes, among other things, processors 1004, memory 1014, and (input/output) I/O components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components, and so forth described herein. The hardware layer 952 also includes memory and/or storage modules memory/storage 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke API calls 908 through the software stack and receive a response such as messages 912 in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924, and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPEG4, H.264, MP3, AAC, AMR, JPG, PNG), graphics libraries (e.g., an OPENGL™ framework that may be used to render 2D and 3D in a graphic content on a display), database libraries (e.g., SQLitc SQLITE™ that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphical user interface (GUI) functions, high-level resource management, high-level location services, and so forth. The frameworks/middleware 918 may provide a broad spectrum of other APIs that may be used by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built in operating system functions (e.g., kernel 922, services 924, and/or drivers 926), libraries 920, and frameworks/middleware 918 to create user interfaces to interact with users of the system. Alternatively, or additionally, in some systems, interactions with a user may occur through a presentation layer, such as presentation layer 914. In these systems, the application/component "logic" can be separated from the aspects of the application/component that interact with a user.

Figure 10:
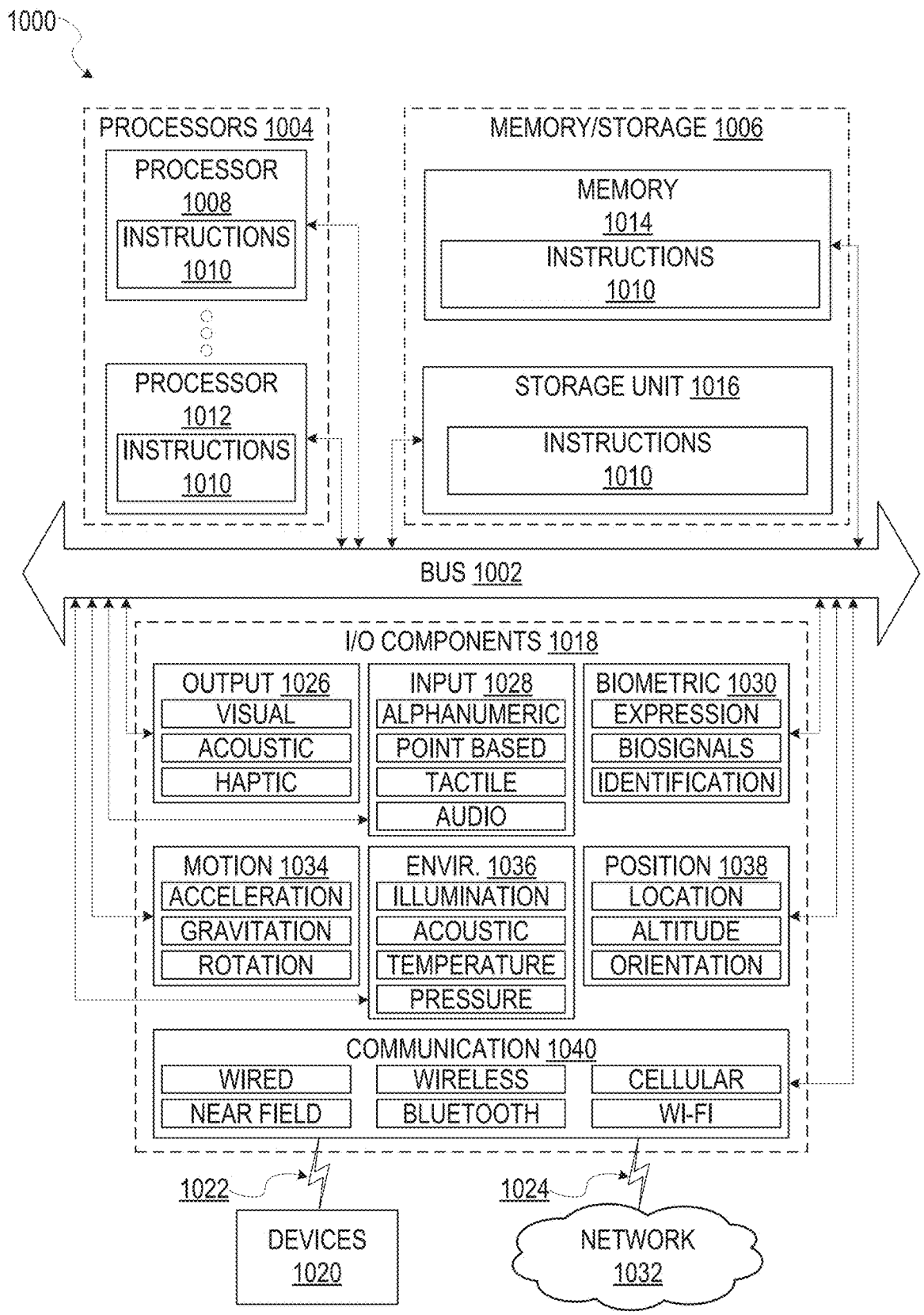
FIG. 10 is a block diagram illustrating components of a machine, according to some example embodiments, able to read instructions from a machine-readable medium (e.g., a machine-readable storage medium) and perform any one or more of the methodologies discussed herein.

FIG. 10 is a block diagram illustrating components of a machine 1000, according to some example embodiments, able to read instructions 904 from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 1000 capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1030, motion components 1034, environmental components 1036, or position components 1038 among a wide array of other components. For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1032 or devices 1020 via coupling 1024 and coupling 1022, respectively. For example, the communication components 1040 may include a network interface component or other suitable device to interface with the network 1032. In further examples, communication components 1040 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a USB).

Moreover, the communication components 1040 may detect identifiers or include components operable to detect identifiers. For example, the communication components 1040 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 1010 for execution by the machine 1000, and includes digital or analog communications signals or other intangible medium to facilitate communication of such instructions 1010. Instructions 1010 may be transmitted or received over the network 1032 using a transmission medium via a network interface device and using any one of a number of well-known transfer protocols.

"CLIENT DEVICE" in this context refers to any machine 1000 that interfaces to a communications network 1032 to obtain resources from one or more server systems or other client devices. A client device 102, 104 may be, but is not limited to, a mobile phone, desktop computer, laptop, PDAs, smart phones, tablets, ultra books, netbooks, laptops, multiprocessor systems, microprocessor-based or programmable consumer electronics, game consoles, STBs, or any other communication device that a user may use to access a network 1032.

"COMMUNICATIONS NETWORK" in this context refers to one or more portions of a network 1032 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 1032 or a portion of a network 1032 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 1010 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 1010. The term "machine-readable medium" shall also be taken to include any medium, or combination of multiple media, that is capable of storing instructions 1010 (e.g., code) for execution by a machine 1000, such that the instructions 1010, when executed by one or more processors 1004 of the machine 1000, cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a stand-alone computer system, a client computer system, or a server computer system) or one or more hardware components of a computer system (e.g., a processor or a group of processors 1004) may be configured by software (e.g., an application 916 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 1004 or other programmable processor 1004. Once configured by such software, hardware components become specific machines 1000 (or specific components of a machine 1000) uniquely tailored to perform the configured functions and are no longer general-purpose processors 1004. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 1004 configured by software to become a special-purpose processor, the general-purpose processor 1004 may be configured as respectively different special-purpose processors (e.g., comprising different hardware components) at different times. Software accordingly configures a particular processor or processors 1004, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 1002) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 1004 that are temporarily configured (e.g., by software) or permanently configured to perform the relevant operations. Whether temporarily or permanently configured, such processors 1004 may constitute processor-implemented components that operate to perform one or more operations or functions described herein. As used herein, "processor-implemented component" refers to a hardware component implemented using one or more processors 1004. Similarly, the methods described herein may be at least partially processor-implemented, with a particular processor or processors 1004 being an example of hardware. For example, at least some of the operations of a method may be performed by one or more processors 1004 or processor-implemented components. Moreover, the one or more processors 1004 may also operate to support performance of the relevant operations in a "cloud computing"

environment or as a "software as a service" (SaaS). For example, at least some of the operations may be performed by a group of computers (as examples of machines 1000 including processors 1004), with these operations being accessible via a network 1032 (e.g., the Internet) and via one or more appropriate interfaces (e.g., an API). The performance of certain of the operations may be distributed among the processors 1004, not only residing within a single machine 1000, but deployed across a number of machines 1000. In some example embodiments, the processors 1004 or processor-implemented components may be located in a single geographic location (e.g., within a home environment, an office environment, or a server farm). In other example embodiments, the processors 1004 or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine 1000. A processor 1004 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor may further be a multi-core processor having two or more independent processors 1004 (sometimes referred to as "cores") that may execute instructions 1010 contemporaneously.

What is claimed is:

1. A method comprising:
    receiving, from a first client device, a first message transmitted as part of a communication session between a first user associated with the first client device and a second user associated with a second client device, the first user and the second user being members of an online service that facilitates the communication session, the second user being an intended recipient of the first message and the first user being a sender of the first message;
    determining, using the first message as input in a statistical model, a set of candidate responses for the second user to reply to the first message in a second message in which the second user is the sender of the second message and the first user is the intended recipient of the second message, the statistical model having been generated based on historical message data transmitted as part of previous communication sessions between a plurality of members of the online service, and the set of candidate responses being a subset of a set of available candidate responses;
    filtering the set of candidate responses based on a personalized vocabulary for the second user, yielding a set of personalized candidate responses, the personalized vocabulary for the second user having been determined based on member profile data associated with the second user, wherein filtering the set of candidate responses based on a personalized vocabulary for the second user comprises:
    determining a demographic category of the first user; and
    filtering the set of candidate responses based on a subset of the personalized vocabulary for the second user that includes keywords commonly used by the second user when communicating with users in the demographic category of the first user;
    determining, based on a set of personalized candidate selection rules, a subset of the set of personalized candidate responses, yielding a set of recommended responses to the first message; and
    causing the set of recommended responses to be presented in a user interface on a display of the second client device, the set of recommended responses presented along with the first message, the user interface configured to allow for selection of the set of recommended responses to transmit the second message to the first user.

2. The method of claim 1, further comprising:
    receiving, from the second client device, a user selection of a first recommended response from the set of recommended responses; and
    transmitting the first recommended response to the first client device as part of the communication session between the first user and the second user.

3. The method of claim 1, wherein the personalized vocabulary for the second user is generated by:
    analyzing a set of text that was authored by the second user and a set of text that was read by the second user to identify keywords that are commonly used by the second user.

4. The method of claim 1, wherein the personalized vocabulary for the second user is generated by:
    analyzing messages authored by the second user to recipients in a first demographic category to identify keywords that are commonly used by the second user when messaging users in the first demographic category.

5. The method of claim 1, further comprising:
    gathering the historical message data transmitted as part of the previous communication sessions;
    identifying, from the historical message data, a set of previous messages; and
    for each previous message in the set of previous messages, normalizing the respective previous message to replace predetermined terms with placeholders, yielding a set of normalized previous messages.

6. The method of claim 5, further comprising:
    identifying a set of unique normalized previous messages from the set of normalized previous messages; and
    determining a subset of the unique normalized previous messages that occur in the set of normalized previous messages at least a threshold number of times, yielding the set of available candidate responses.

7. The method of claim 6, further comprising:
    for each instance of an available candidate response in the historical message data, identifying a previous message that preceded the respective instance of the available candidate response, yielding a set of preceding previous messages; and
    generating the statistical model based on the set of preceding previous messages.

8. The method of claim 6, further comprising:
    for each available candidate response from the set of available candidate responses, assigning the respective available candidate response to one of a plurality of candidate groups based on a meaning of the respective available candidate response.

9. The method of claim 8, wherein the set of personalized candidate selection rules dictates a maximum number of candidate responses that can be selected from each candidate group.

10. A messaging system comprising:
one or more computer processors; and
one or more computer-readable mediums storing instructions that, when executed by the one or more computer processors, cause the messaging system to perform operations comprising:
receiving, from a first client device, a first message transmitted as part of a communication session between a first user associated with the first client device and a second user associated with a second client device, the first user and the second user being members of an online service that facilitates the communication session, the second user being an intended recipient of the first message and the first user being a sender of the first message;
determining, using the first message as input in a statistical model, a set of candidate responses for the second user to reply to the first message in a second message in which the second user is the sender of the second message and the first user is the intended recipient of the second message, the statistical model having been generated based on historical message data transmitted as part of previous communication sessions between a plurality of members of the online service, and the set of candidate responses being a subset of a set of available candidate responses;
filtering the set of candidate responses based on a personalized vocabulary for the second user, yielding a set of personalized candidate responses, the personalized vocabulary for the second user having been determined based on member profile data associated with the second user, wherein filtering the set of candidate responses based on a personalized vocabulary for the second user comprises:
determining a demographic category of the first user; and
filtering the set of candidate responses based on a subset of the personalized vocabulary for the second user that includes keywords commonly used by the second user when communicating with users in the demographic category of the first user;
determining, based on a set of personalized candidate selection rules, a subset of the set of personalized candidate responses, yielding a set of recommended responses to the first message; and
causing the set of recommended responses to be presented in a user interface on a display of the second client device, the set of recommended responses presented along with the first message, the user interface configured to allow for selection of the set of recommended responses to transmit the second message to the first user.

11. The messaging system of claim 10, the operations further comprising:
receiving, from the second client device, a user selection of a first recommended response from the set of recommended responses; and
transmitting the first recommended response to the first client device as part of the communication session between the first user and the second user.

12. The messaging system of claim 10, wherein the personalized vocabulary for the second user is generated by:
analyzing a set of text that was authored by the second user and a set of text that was read by the second user to identify keywords that are commonly used by the second user.

13. The messaging system of claim 10, wherein the personalized vocabulary for the second user is generated by:
analyzing messages authored by the second user to recipients in a first demographic category to identify keywords that are commonly used by the second user when messaging users in the first demographic category.

14. The messaging system of claim 10, the operations further comprising:
gathering the historical message data transmitted as part of the previous communication sessions;
identifying, from the historical message data, a set of previous messages; and
for each previous message in the set of previous messages, normalizing the respective previous message to replace predetermined terms with placeholders, yielding a set of normalized previous messages.

15. The messaging system of claim 14, the operations further comprising:
identifying a set of unique normalized previous messages from the set of normalized previous messages; and
determining a subset of the unique normalized previous messages that occur in the set of normalized previous messages at least a threshold number of times, yielding the set of available candidate responses.

16. The messaging system of claim 15, the operations further comprising:
for each instance of an available candidate response in the historical message data, identifying a previous message that preceded the respective instance of the available candidate response, yielding a set of preceding previous messages; and
generating the statistical model based on the set of preceding previous messages.

17. The messaging system of claim 15, the operations further comprising:
for each available candidate response from the set of available candidate responses, assigning the respective available candidate response to one of a plurality of candidate groups based on a meaning of the respective available candidate response, wherein the set of personalized candidate selection rules dictates a maximum number of candidate responses that can be selected from each candidate group.

18. A non-transitory computer-readable medium storing instructions that, when executed by one or more computer processors of a messaging system, cause the messaging system to perform operations comprising:
receiving, from a first client device, a first message transmitted as part of a communication session between a first user associated with the first client device and a second user associated with a second client device, the first user and the second user being members of an online service that facilitates the communication session, the second user being an intended recipient of the first message and the first user being a sender of the first message;
determining, using the first message as input in a statistical model, a set of candidate responses for the second user to reply to the first message in a second message in which the second user is the sender of the second message and the first user is the intended recipient of the second message, the statistical model having been generated based on historical message data transmitted as part of previous communication sessions between a plurality of members of the online service, and the set of candidate responses being a subset of a set of available candidate responses;
filtering the set of candidate responses based on a personalized vocabulary for the second user, yielding a set of personalized candidate responses, the personalized vocabulary for the second user having been determined based on member profile data associated with the second user, wherein filtering the set of candidate responses based on a personalized vocabulary for the second user comprises:

determining a demographic category of the first user; and filtering the set of candidate responses based on a subset of the personalized vocabulary for the second user that includes keywords commonly used by the second user when communicating with users in the demographic category of the first user;

determining, based on a set of personalized candidate selection rules, a subset of the set of personalized candidate responses, yielding a set of recommended responses to the first message; and causing the set of recommended responses to be presented in a user interface on a display of the second client device, the set of recommended responses presented along with the first message, the user interface configured to allow for selection of the set of recommended responses to transmit the second message to the first user.

\* \* \* \* \*